US010614143B2

(12) United States Patent
Jiang et al.

(10) Patent No.: US 10,614,143 B2
(45) Date of Patent: Apr. 7, 2020

(54) SYSTEMS AND METHODS FOR AUTOMATED PAGE CATEGORY RECOMMENDATION

(71) Applicant: Facebook, Inc., Menlo Park, CA (US)

(72) Inventors: Wenzhe Jiang, Seattle, WA (US); Jinyi Yao, Issaquah, WA (US)

(73) Assignee: Facebook, Inc., Menlo Park, CA (US)

( * ) Notice: Subject to any disclaimer, the term of this patent is extended or adjusted under 35 U.S.C. 154(b) by 257 days.

(21) Appl. No.: 15/687,974

(22) Filed: Aug. 28, 2017

(65) Prior Publication Data

US 2019/0065606 A1    Feb. 28, 2019

(51) Int. Cl.
*G06F 17/30* (2006.01)
*G06F 16/9535* (2019.01)
*G06F 7/02* (2006.01)

(52) U.S. Cl.
CPC .......... *G06F 16/9535* (2019.01); *G06F 7/026* (2013.01)

(58) Field of Classification Search
CPC ............. G06F 16/9535; G06F 16/9536; G06F 16/954; G06F 17/30867; G06F 7/026
See application file for complete search history.

(56) References Cited

U.S. PATENT DOCUMENTS

| 2010/0306249 | A1* | 12/2010 | Hill ........................ G06Q 30/02 707/769 |
| 2013/0085893 | A1* | 4/2013 | Bhardwaj .......... G06Q 30/0643 705/26.62 |
| 2015/0052098 | A1* | 2/2015 | Kveton .................... G06N 5/02 706/52 |
| 2015/0363499 | A1* | 12/2015 | Cheng ................ G06F 16/9535 707/722 |
| 2016/0063126 | A1* | 3/2016 | Nelken ............... G06F 16/9535 707/726 |
| 2017/0083602 | A1* | 3/2017 | Liu ........................ G06F 16/285 |
| 2017/0139939 | A1* | 5/2017 | Rougier ................ G06F 16/335 |

* cited by examiner

*Primary Examiner* — Greta L Robinson
(74) *Attorney, Agent, or Firm* — Sheppard Mullin Richter & Hampton LLP

(57) ABSTRACT

Systems, methods, and non-transitory computer-readable media can receive page information associated with a page and user information associated with a user associated with the page. Confidence scores are calculated for a plurality of categories based on the page information and the user information, wherein a confidence score for a category is indicative of a likelihood that the category is relevant to the page. One or more categories of the plurality of categories are selected based on the confidence scores. The one or more categories are presented to the user as category recommendations.

14 Claims, 7 Drawing Sheets

500

```
┌─────────────────────────────────────────────────────────────────────────┐
│ Receive page information associated with a page and user information    │
│ associated with a user associated with the page                         │
│                              502                                         │
└─────────────────────────────────────────────────────────────────────────┘
                                    │
                                    ▼
┌─────────────────────────────────────────────────────────────────────────┐
│ Calculate confidence scores for a plurality of categories based on the  │
│ page information and the user information, wherein a confidence score   │
│ for a category is indicative of a likelihood that the category is       │
│ relevant to the page                                                     │
│                              504                                         │
└─────────────────────────────────────────────────────────────────────────┘
                                    │
                                    ▼
┌─────────────────────────────────────────────────────────────────────────┐
│ Select one or more categories of the plurality of categories based on   │
│ the confidence scores                                                    │
│                              506                                         │
└─────────────────────────────────────────────────────────────────────────┘
                                    │
                                    ▼
┌─────────────────────────────────────────────────────────────────────────┐
│ Present the one or more categories to the user as category              │
│ recommendations                                                          │
│                              508                                         │
└─────────────────────────────────────────────────────────────────────────┘
```

FIGURE 5

SYSTEMS AND METHODS FOR AUTOMATED PAGE CATEGORY RECOMMENDATION

FIELD OF THE INVENTION

The present technology relates to the field of social networking systems. More particularly, the present technology relates to systems and methods for automated page category recommendation on a social networking system.

BACKGROUND

Today, people often utilize computing devices (or systems) for a wide variety of purposes. Users can use their computing devices, for example, to interact with one another, create content, share content, and view content. In some cases, a user can utilize his or her computing device to access a social networking system (or service). The user can provide, post, share, and access various content items, such as status updates, images, videos, articles, and links, via the social networking system.

A social networking system can include pages that are associated with users or entities. The pages can be dedicated locations on the social networking system to reflect the presence of the users and entities on the social networking system. The users and entities associated with such pages can be provided with the opportunity to interact with other users on the social networking system.

SUMMARY

Various embodiments of the present disclosure can include systems, methods, and non-transitory computer readable media configured to receive page information associated with a page and user information associated with a user associated with the page. Confidence scores are calculated for a plurality of categories based on the page information and the user information, wherein a confidence score for a category is indicative of a likelihood that the category is relevant to the page. One or more categories of the plurality of categories are selected based on the confidence scores. The one or more categories are presented to the user as category recommendations.

In an embodiment, confidence scores are calculated for the plurality of categories using one or more machine learning models.

In an embodiment, calculating confidence scores for a plurality of categories comprises: calculating confidence scores for a first set of categories based on a first machine learning model; and calculating confidence scores for a second set of categories based on a second machine learning model.

In an embodiment, the first set of categories is filtered based on a first confidence score threshold to yield a filtered first set of categories.

In an embodiment, categories in the filtered first set of categories and the second set of categories are ranked based on confidence score.

In an embodiment, ranking categories in the filtered first set of categories and the second set of categories comprises ranking each category in the filtered first set of categories ahead of each category in the second set of categories.

In an embodiment, the second set of categories is filtered based on a second confidence score threshold to yield a filtered second set of categories.

In an embodiment, calculating confidence scores for a plurality of categories further comprises calculating confidence scores for a third set of categories based on a third machine learning model.

In an embodiment, categories in the filtered first set of categories, the filtered second set of categories, and the third set of categories are ranked based on confidence score. The ranking comprises ranking each category in the filtered first set of categories ahead of each category in the filtered second set of categories, and ranking each category in the filtered second set of categories ahead of each category in the third set of categories.

In an embodiment, the selecting one or more categories of the plurality of categories comprises selecting a predetermined number of categories.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 5 illustrates an example method associated with automated page category recommendation, according to an embodiment of the present disclosure.

Figure 1:
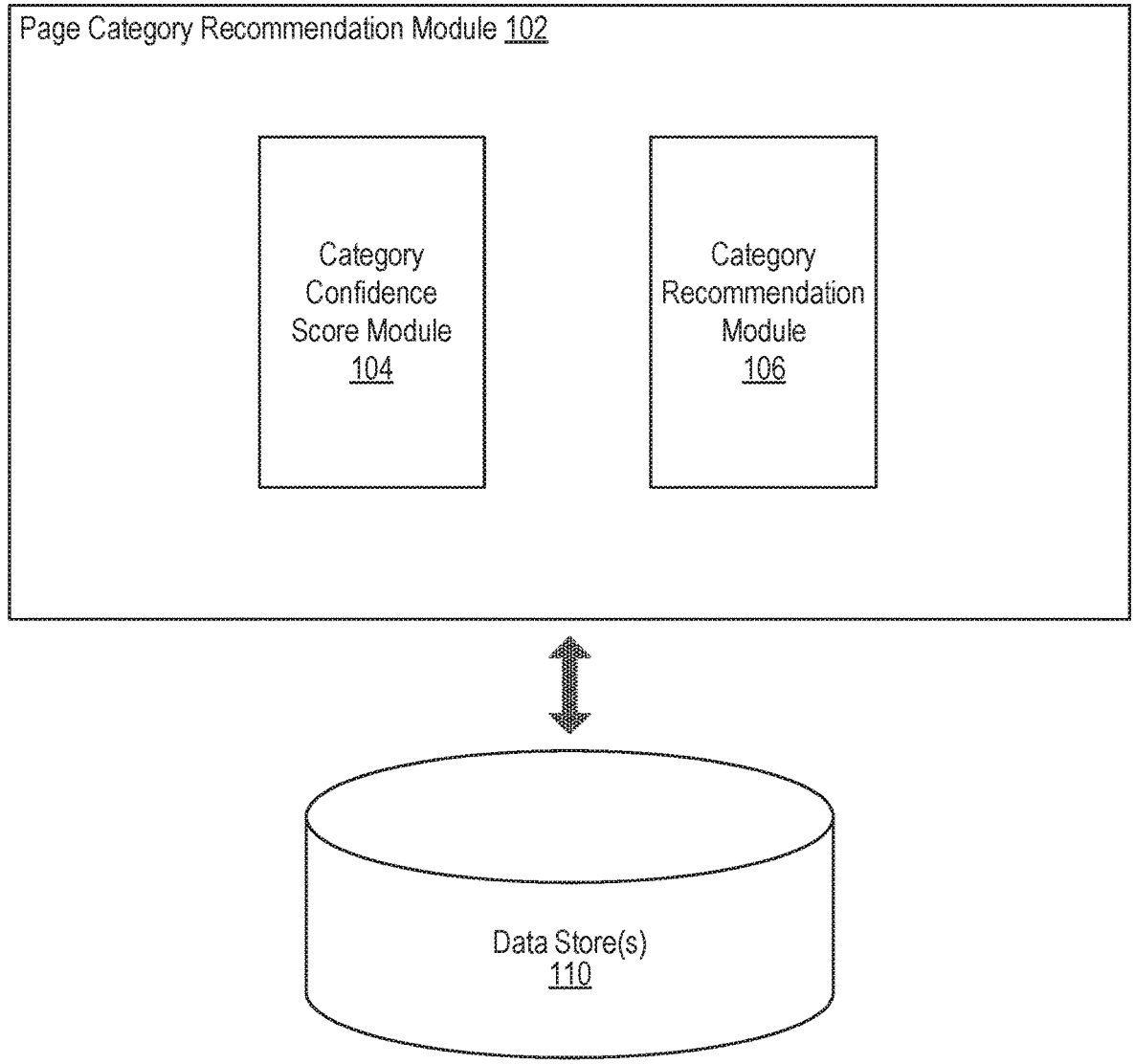
FIG. 1 illustrates an example system including a page category recommendation module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Automated Page Category Recommendation

People use computing devices (or systems) for a wide variety of purposes. Users can use their computing devices, for example, to interact with one another, create content, share content, and view content. In some cases, a user can utilize his or her computing device to access a social networking system (or service). The user can provide, post, share, and access various content items, such as status updates, images, videos, articles, and links, via the social networking system.

The social networking system may provide pages for various entities. For example, pages may be associated with companies, businesses, brands, products, artists, public figures, entertainment, individuals, and other types of entities. The pages can be dedicated locations on the social networking system to reflect the presence of the entities on the social networking system. A page can publish content that is deemed relevant to its associated entity to promote engagement with the page. Pages on the social networking system may provide users of the social networking system with an opportunity to discover and interact with the various entities associated with the pages.

Under conventional approaches, a page associated with an entity may be managed by one or more users associated with the page. Such users may sometimes be referred to as administrators or "admins." When a user wishes to create a page, the user may be asked to provide certain page information. Page information can include, for example, a name for the page, a description of the page, and/or a category for the page. The category associated with a page may play an important role in users discovering and otherwise interacting with the page. In one example, page categories may be used as a feature in user searches for pages. For example, a user searching for restaurants may be provided with a list of pages that are associated with the category "restaurants." In another example, page categories may be used in advertisement targeting. For example, if a page is associated with the category "health and fitness," advertisements for the page may be targeted and presented to users that are interested in health and fitness.

If a page is inappropriately or inaccurately categorized, the page's interactions on the social networking system may be negatively affected. For example, if a page is not accurately categorized, users searching for particular goods or services may be unable to find the page due to the page's inaccurate categorization. In another example, an inaccurately categorized page's advertisements may be provided to users that have no interest in the page. Such misdirected advertisements represent a missed opportunity for the page to engage with another user that may have had interest in the page. Poor user engagement or interactions caused by inaccurate page categorization may discourage users from creating or utilizing pages on a social networking system. As such, it is an important consideration for a social networking system for pages on the social networking system to be categorized appropriately and accurately.

However, accurate and appropriate categorization of pages can prove challenging for various reasons. For example, a user creating a page may be asked to select one or more categories from a very large number of potential categories. Under conventional approaches, a user creating a page may be asked to select a single category or a handful of categories out of a significant number of potential categories. Due to the importance of selecting an appropriate category, and the enormous number of potential categories to choose from, users may find the category selection experience to be difficult, burdensome, or stressful. Conventional approaches may not be effective in addressing these and other problems arising in computer technology.

An improved approach rooted in computer technology overcomes the foregoing and other disadvantages associated with conventional approaches specifically arising in the realm of computer technology. In general, when a user is creating a page, one or more page category recommendations may be automatically determined and presented to the user. As the user is creating the page, the user may be asked to provide page information. Page information can include, for example, a page name and/or a page description. One or more machine learning models can be used to determine confidence scores for various categories based on the page information and/or user information associated with a user creating a page. The confidence scores calculated by the one or more machine learning models can be used to determine page category recommendations. Each machine learning model of the one or more machine learning models can be configured to calculate confidence scores for a particular set of categories. For example, a first machine learning model can be trained to calculate a first set of confidence scores for a first set of categories based on page information. In one embodiment, the first set of categories can be a set of specific categories. Specific categories may have a relatively low level of abstraction relative to a set of general categories. A second machine learning model can be trained to calculate a second set of confidence scores for a second set of categories based on page information. In one embodiment, the second set of categories can be a set of general categories. General categories can be categories that are at a relatively higher level of abstraction than the specific categories. A third machine learning model can be trained to calculate a third set of confidence scores for a third set of categories based on user information associated with a user creating a page. In one embodiment, the third set of categories can be a set of popular categories that have been frequently selected by previous users.

In certain embodiments, the various machine learning models, and their associated sets of categories, can be ranked in order of preference. For example, the first machine learning model may be preferred over the second machine learning model, and the second machine learning model may be preferred over the third machine learning model. By ranking the machine learning models in this manner, a preference can be indicated for specific categories over general categories, and for general categories over popular categories. In various embodiments, categories in the first set of categories (e.g., specific categories) that satisfy a first confidence score threshold can be selected as potential category recommendations. If there are insufficient categories in the first set of categories that satisfy the first confidence score threshold, then categories in the second set of categories (e.g., general categories) that satisfy a second confidence score threshold can be selected as potential category recommendations. If there are still insufficient categories in the first and second sets of categories that satisfy the first and second confidence score thresholds, respectively, then one or more categories can be selected from the third set of categories (e.g., popular categories) based on the third set of confidence scores. One or more category recommendations can be provided to the user, for example, via a computing device user interface.

FIG. 1 illustrates an example system 100 including an example page category recommendation module 102, according to an embodiment of the present disclosure. The page category recommendation module 102 can be configured to automatically determine and provide one or more category recommendations based on page information associated with a page being created and/or user information associated with a user creating the page. In various embodiments, the page category recommendation module 102 can be configured to determine page category recommendations based on one or more machine learning models. Each machine learning model can be trained to determine confidence scores for a particular set of categories based on page and/or user information. For example, a first machine learning model can be trained to calculate a first set of confidence scores for a first set of categories based on page information. The first machine learning model can be, for example, a specific category machine learning model, and the first set of categories can be a set of specific categories. Each specific category can have a relatively low level of abstraction in comparison to a set of general categories. A second machine learning model can be trained to calculate a second set of confidence scores for a second set of categories based on page information. In one embodiment, the second machine learning model can be a general category machine learning model, and the second set of categories can be a set of general categories, each general category having a relatively high level of abstraction in comparison to the set of specific categories. A third machine learning model can be trained to calculate a third set of confidence scores for a third set of categories based on user information. In one embodiment, the third machine learning model can be a popular category machine learning model, and the third set of categories can be a set of popular categories that have frequently been selected by users of a social networking system. The user information can be, for example, user information associated with a user creating the page. The popular category machine learning model can, for example, be trained to calculate confidence scores for each category in the set of popular categories based on which categories have historically been selected by users similar to the user creating the page.

In certain embodiments, the various sets of categories analyzed by the various machine learning models can differ from one another. For example, the set of specific categories can differ from the set of general categories. In various embodiments, specific categories and general categories can be identified as such based on a hierarchical structure, such as a tree structure, which arranges categories into different levels. For example, the hierarchical structure can include a first level of categories that identify categories at a relatively high level of abstraction, e.g., restaurant, shopping/retail, automotive, etc. Each category in the first level of categories can include one or more sub-categories, or child categories. For example, the restaurant category can include sub-categories such as Japanese restaurants, Italian restaurants, Chinese restaurants, American restaurants, fusion restaurants, fast food restaurants, fine dining, etc. Each of those sub-categories may have their own sub-categories. For example, the Japanese restaurants category can include sub-categories such as ramen restaurants, sushi restaurants, udon restaurants, etc. The set of specific categories can include categories from lower levels in the hierarchical structure having a relatively low level of abstraction compared to the set of general categories (e.g., Chinese restaurant, wine/beer/spirits retailer, car dealership, etc.). The set of general categories can include categories from higher levels in the hierarchical structure having a relatively high level of abstraction compared to the set of specific categories (e.g., restaurant, shopping/retail, automotive, etc.). As such, the set of specific categories can include a greater number of categories than the set of general categories.

In various embodiments, the set of popular categories can include a plurality of categories that are historically the most commonly selected categories, i.e., the most popular categories. In other embodiments, the set of popular categories can include any combination of categories. For example, the set of popular categories can include all possible categories, one or more specific categories, one or more general categories, a combination of specific and general categories, and/or categories that are not included in the sets of specific categories or general categories.

In certain embodiments, the various machine learning models and/or the various sets of categories may be ranked in order of preference. The page category recommendation module 102 can be configured to select category recommendations based, at least in part, on the order of preference of the various models and/or sets of categories. For example, it may be preferable, whenever possible, to recommend one or more specific categories from the set of specific categories. However, if a specific category recommendation is not possible, e.g., if there are not a sufficient number of specific categories having a sufficiently high confidence score, then it may be preferable to recommend a general category. However, if there are not enough general categories having a sufficiently high confidence score, then a popular category can be recommended. In this regard, the set of specific categories and the specific category machine learning model may be preferred over the set of general categories and the general category machine learning model. Similarly, the set of general categories and the general category machine learning model may be preferred over the set of popular categories and the popular category machine learning model. In this regard, specific categories that satisfy a first confidence score threshold can be selected by the page category recommendation module 102 as category recommendations. However, if there are insufficient specific categories that satisfy the first confidence score threshold, then general categories that satisfy a second confidence score threshold can be selected by the page category recommendation module 102 as category recommendations. If there are still insufficient specific categories and general categories that satisfy the first and second confidence score thresholds, respectively, then one or more popular categories can be selected by the page category recommendation module 102 based on the third set of confidence scores. The page category recommendation module 102 can select one or more categories to recommend to a user, and the one or more categories can be presented to a user, for example, via a computing device user interface.

As shown in the example of FIG. 1, the page category recommendation module 102 can include a category confidence score module 104 and a category recommendation module 106. In some instances, the example system 100 can include at least one data store 110. The components (e.g., modules, elements, etc.) shown in this figure and all figures herein are exemplary only, and other implementations may include additional, fewer, integrated, or different components. Some components may not be shown so as not to obscure relevant details. In various embodiments, one or more of the functionalities described in connection with the page category recommendation module 102 can be implemented in any suitable combinations.

In some embodiments, the page category recommendation module 102 can be implemented, in part or in whole, as software, hardware, or any combination thereof. In general, a module, as discussed herein, can be associated with software, hardware, or any combination thereof. In some implementations, one or more functions, tasks, and/or operations of modules can be carried out or performed by software routines, software processes, hardware, and/or any combination thereof. In some cases, the page category recommendation module 102 can be implemented, in part or in whole, as software running on one or more computing devices or systems, such as on a user or client computing device. For example, the page category recommendation module 102, or at least a portion thereof, can be implemented as or within an application (e.g., app), a program, or an applet, etc., running on a user computing device or a client computing system, such as the user device 610 of FIG. 6. In another example, the page category recommendation module 102, or at least a portion thereof, can be implemented using one or more computing devices or systems that include one or more servers, such as network servers or cloud servers. In some instances, the page category recommendation module 102 can, in part or in whole, be implemented within or configured to operate in conjunction with a social networking system (or service), such as the social networking system 630 of FIG. 6. It should be understood that there can be many variations or other possibilities.

The page category recommendation module 102 can be configured to communicate and/or operate with the at least one data store 110, as shown in the example system 100. The data store 110 can be configured to store and maintain various types of data. In some implementations, the data store 110 can store information associated with the social networking system (e.g., the social networking system 630 of FIG. 6). The information associated with the social networking system can include data about users, user identifiers, social connections, social engagements, profile information, demographic information, locations, geo-fenced areas, maps, places, events, pages, groups, posts, communications, content, feeds, account settings, privacy settings, a social graph, and various other types of data. In some embodiments, the data store 110 can store information that is utilized by the page category recommendation module 102. For example, the data store 110 can store page category hierarchical information, historical page category data, one or more machine learning models, page information, user information, and the like. It is contemplated that there can be many variations or other possibilities.

The category confidence score module 104 can be configured to analyze one or more sets of categories, and to calculate confidence scores for each category in the one or more sets of categories based on page information associated with a page and/or user information associated with a creator of the page. A confidence score associated with a category can be indicative of a likelihood that the category is relevant to the page. In various embodiments, the category confidence score module 104 can utilize one or more machine learning models to calculate confidence scores for various categories based on page information and/or user information. For example, a specific category machine learning model can be utilized by the category confidence score module 104 to calculate a first set of confidence scores for a set of specific categories based on page information associated with a page. A general category machine learning model can be utilized by the category confidence score module 104 to calculate a second set of confidence scores for a set of general categories based on page information associated with a page. A popular category machine learning model can be utilized by the category confidence score module 104 to calculate a third set of confidence scores for a set of popular categories based on user information associated with a creator of a page. The category confidence score module 104 is described in greater detail herein with reference to FIG. 2.

The category recommendation module 106 can be configured to identify one or more categories for recommendation to a user based, at least in part, on category confidence scores. The category recommendation module 106 can receive a set of categories and confidence scores associated with each category in the set of categories. For example, the category recommendation module 106 can receive a set of specific categories, and confidence scores for each specific category in the set of specific categories; a set of general categories and confidence scores for each general category in the set of general categories; and a set of popular categories and confidence scores for each popular category in the set of popular categories. In various embodiments, the category recommendation module 106 can filter categories based on various confidence score thresholds. For example, the category recommendation module 106 can filter out any specific categories in the set of specific categories that do not satisfy a first confidence score threshold. The category recommendation module 106 can filter out any general categories in the set of general categories that do not satisfy a second confidence score threshold. Based on the remaining categories that have not been filtered out, the category recommendation module 106 can select one or more categories to present to a user as category recommendations. The category recommendation module 106 is described in greater detail herein with reference to FIG. 3.

Figure 2:
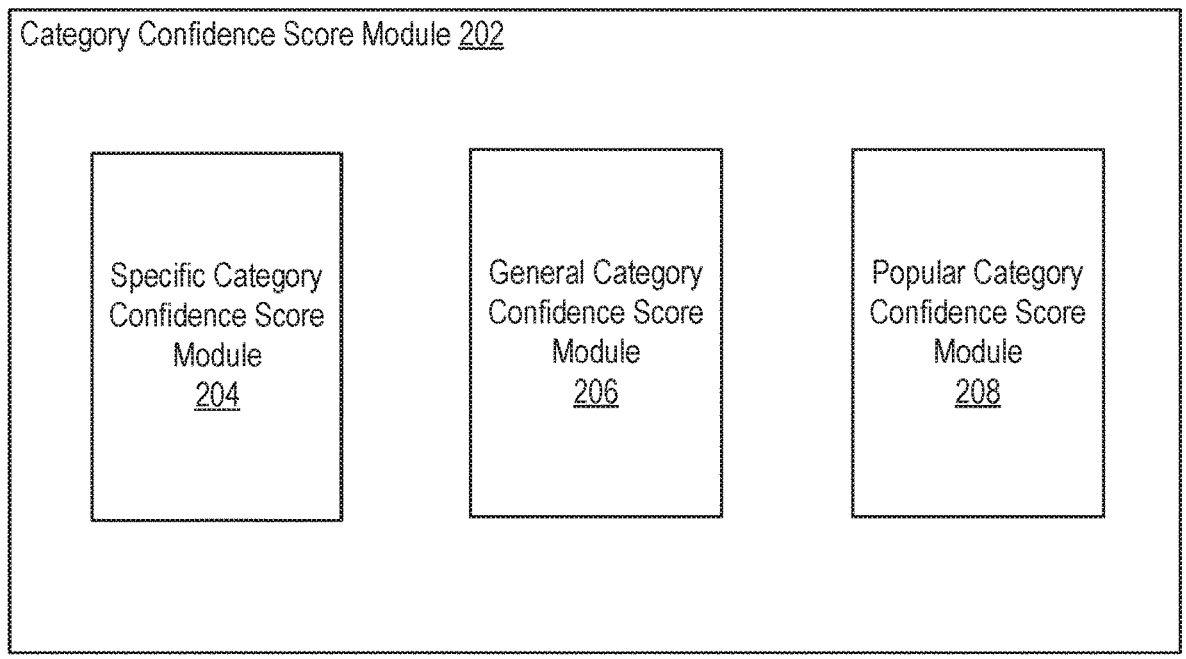
FIG. 2 illustrates an example category confidence score module, according to various embodiments of the present disclosure.

FIG. 2 illustrates an example category confidence score module 202 configured to calculate confidence scores for a plurality of categories based on page information and/or user information, according to an embodiment of the present disclosure. In some embodiments, the category confidence score module 104 of FIG. 1 can be implemented as the category confidence score module 202. As shown in the example of FIG. 2, the category confidence score module 202 can include a specific category confidence score module 204, a general category confidence score module 206, and a popular category confidence score module 208.

The specific category confidence score module 204 can be configured to calculate confidence scores for each category in a set of specific categories based on page information associated with a page being created. Page information can include, for example, a page name and/or a page description provided by a user creating the page. The set of specific categories can include a plurality of pre-defined categories that have been identified as specific categories. In various embodiments, the specific category confidence score module 204 can calculate confidence scores for the set of specific categories using a specific category machine learning model. The specific category machine learning model can be trained using historical category selection data and historical page information. For example, the specific category machine learning model can be provided with training data comprising a set of previous pages, with each previous page being associated with page information (e.g., a page name and/or a page description) and a specific category selected by a creator of the page. Based on this training data, the specific category machine learning model can be trained to receive page information and calculate confidence scores for a set of specific categories based on the page information. In certain embodiments, the specific category machine learning model can be trained using a convolutional neural network technique. A confidence score calculated for a category in the set of specific categories can be indicative of a likelihood that the category is relevant to the page being created based on the page's name and/or description, or other page information. For example, if a page is named "Joe's Sushi," it is very likely that the category "sushi restaurants" is relevant to the page. As such, the category "sushi restaurants" would receive a relatively high confidence score. However, it is very unlikely that the category "automotive repair" is relevant to the Joe's Sushi page. As such, the category "automotive repair" would receive a relatively low confidence score.

The general category confidence score module 206 can be configured to calculate confidence scores for each category in a set of general categories based on page information associated with a page being created. The set of general categories can include a plurality of pre-defined categories that have been identified as general categories. In various embodiments, the general category confidence score module 206 can calculate confidence scores for the set of general categories using a general category machine learning model. The general category machine learning model can be trained using historical category selection data and historical page information. For example, the general category machine learning model can be provided with training data comprising a set of previous pages, with each previous page being associated with page information (e.g., a page name and/or page description) and a general category selected by the creator of the page. Based on this training data, the general category machine learning model can be trained to receive page information and to calculate confidence scores for a set of general categories based on the page information. In certain embodiments, the general category machine learning model can be trained using a convolutional neural network technique. A confidence score calculated for a category in the set of general categories can be indicative of a likelihood that the category is relevant to the page being created based on the page's name and/or description, or other page information.

The popular category confidence score module 208 can be configured to calculate confidence scores for each category in a set of popular categories based on user information associated with a user creating a page. User information can include any information associated with a user that may be useful in identifying a category recommendation for a page. This might include, for example, user demographic information, user education information, user professional information, page information associated with other pages previously created by the user, posts and/or comments previously posted by the user to a social networking system, posts liked and/or shared by the user on the social networking system, groups and/or pages that the user has visited, followed, liked, joined, or otherwise engaged with on the social networking system, or other social network engagement information. The popular category confidence score module 208 can calculate confidence scores for the set of popular categories using a popular category machine learning model. The popular category machine learning model can be trained using historical user information and historical category selection data. For example, the popular category machine learning model can be provided with training data comprising a set of previous pages, with each previous page being associated with a user, user information associated with the user, and a category selection made by the user for the page. Based on this training data, the popular category machine learning model can be trained to receive user information, and to calculate confidence scores for a set of popular categories based on the user information. In certain embodiments, the popular category machine learning model can be trained to determine which categories were the most common categories selected by users similar to a current user creating a page. In certain embodiments the popular category machine learning model can be trained using gradient boosted decision tree techniques. A confidence score calculated for a category in the set of popular categories can be indicative of how frequently previous users similar to the current user have selected the category, and, therefore, can also be indicative of a likelihood that the category is relevant to the page currently being created by the current user.

In certain embodiments, the popular category confidence score module 208 can optimize feature dimensionality based on embedding techniques so as to transfer high dimensional feature values into lower dimensional feature values. For example, a social networking system may have hundreds of millions of pages. User information indicating that a first user has visited Pages A, B, and C is a very sparse feature. For example, the first user's visited page vector may have 100 million dimensions, one dimension for each page on social networking system, and if the first user has only visited three pages, then there are only three positive values (e.g., 1's) and 999,999,997 negative values (e.g., 0's). Such sparse features may be difficult to utilize effectively. These features can be utilized more effectively if the dimensionality of such features can be decreased. For example, the 100 million pages on a social networking system can be grouped into 100 page clusters based on embeddings of the pages and distances between the embeddings. In this way, if a user has visited Page A, which belongs to a first page cluster (cluster 1), Page B, which belong to a second page cluster (cluster 2), and Page C, which belongs to a third page cluster (cluster 3), the user can be described as having visited 3 page clusters out of 100 page clusters, rather than having visited 3 pages out of 100 million pages. The lower dimensional feature values can be provided to the popular category machine learning model for more effective utilization of those features.

Figure 3:
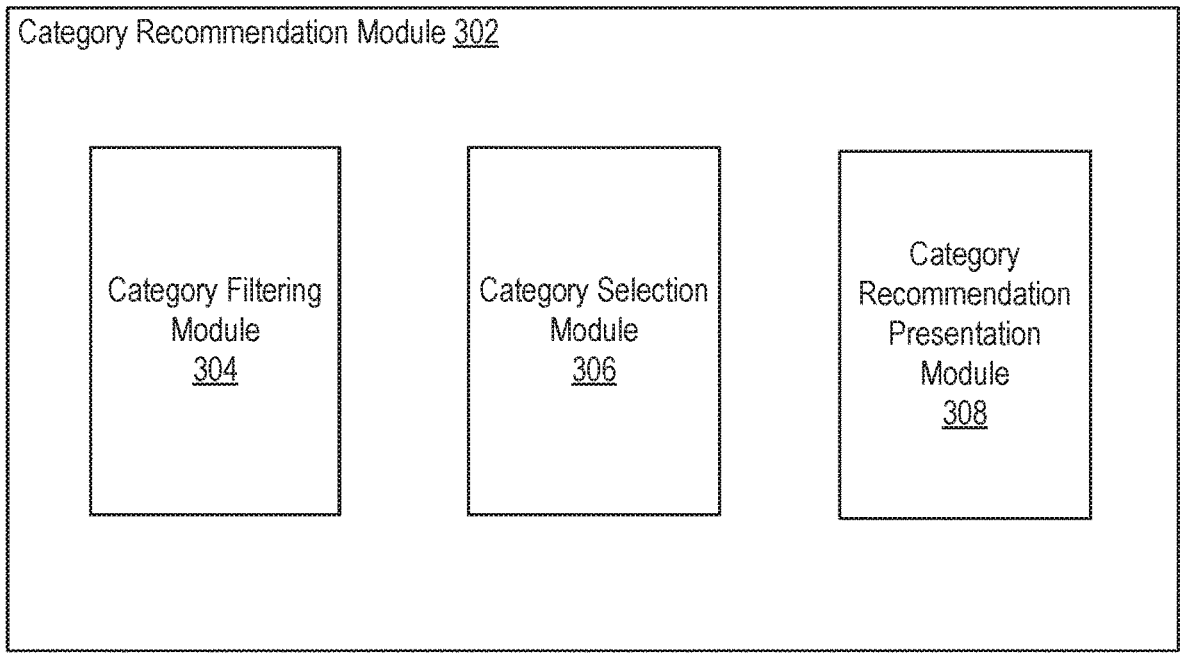
FIG. 3 illustrates an example category recommendation module, according to various embodiments of the present disclosure.

FIG. 3 illustrates an example category recommendation module 302 configured to automatically select and present one or more categories as category recommendations for a user, according to an embodiment of the present disclosure. In some embodiments, the category recommendation module 106 of FIG. 1 can be implemented as the category recommendation module 302. As shown in the example of FIG. 3, the category recommendation module 302 can include a category filtering module 304, a category selection module 306, and a category recommendation presentation module 308.

The category filtering module 304 can be configured to filter categories based on one or more filtering criteria. In various embodiments, the category filtering module 304 can filter categories in the set of specific categories based on a first confidence score threshold. Any categories in the set of specific categories that do not have a confidence score that satisfies the first confidence score threshold (e.g., that do not meet or exceed the first confidence score threshold) can be removed from consideration as a category recommendation. In various embodiments, the category filtering module 304 can filter categories in the set of general categories based on a second confidence score threshold. Any categories in the set of general categories that do not have a confidence score that satisfies the second confidence score threshold (e.g., that do not meet or exceed the second confidence score threshold) can be removed from consideration as a category recommendation. In certain embodiments, the first confidence score threshold can represent a higher level of certainty than the second confidence score threshold. For example, if confidence scores are calculated on a range from 0 to 1, with 1 indicating a highest certainty and 0 indicating a lowest certainty, the first confidence score threshold can be approximately 0.6 or 0.7 and the second confidence score threshold can be approximately 0.2.

The category selection module 306 can be configured to automatically select one or more categories from a plurality of categories based on category selection criteria. As described above, a specific category machine learning model can provide a set of confidence scores associated with a set of specific categories; a general category machine learning model can provide a set of confidence scores associated with a set of general categories; and a popular category machine learning model can provide a set of confidence scores associated with a set of popular categories. Furthermore, filtering of the set of specific categories may result in a filtered set of specific categories, and filtering of the set of general categories may result in a filtered set of general categories. The filtered set of specific categories, the filtered set of general categories, and the set of popular categories can represent a corpus of categories for potential selection as category recommendations. In various embodiments, the category selection module 306 can be configured to select categories based on an order of preference between the sets of categories, and based on confidence score. For example, the order of preference between the sets of categories may specify that the filtered set of specific categories is to be given preference over the filtered set of general categories, and the filtered set of general categories is to be given preference over the set of popular categories. The category selection module 306 can be configured to rank all categories in the filtered set of specific categories, the filtered set of general categories, and the set of popular categories. The ranking can be performed based on the order of preference between the sets of categories and confidence score. For example, categories can be ranked such that all specific categories from the filtered set of specific are at the top of the ranking in order of confidence score, followed by all general categories in the filtered set of general categories ranked in order of confidence score, followed by all popular categories in the set of popular categories ranked in order of confidence score. Confidence scores can then be selected in order based on the ranking.

For example, consider the following example scenario. A set of specific categories includes the following categories and associated confidence scores: Category A, confidence score 1.0; Category B, confidence score 0.8, Category C, confidence score 0.6. A set of general categories includes the following categories and associated confidence scores: Category D, confidence score 1.0; Category E, confidence score 0.6; Category F, confidence score 0.1. Finally, a set of popular categories includes the following categories and associated confidence scores: Category G, confidence score 0.8; Category H, confidence score 0.3; Category I, confidence score 0.1. A first confidence score threshold, which is applied to the set of specific categories, is set at 0.7. This results in a filtered set of specific categories that includes Category A and Category B, but excludes Category C. A second confidence score threshold, applied to the set of general categories, is set at 0.2. This results in a filtered set of general categories that includes Category D and Category E, but excludes Category F. The category selection module 306 can be configured to rank the remaining categories based first on order of preference of sets of categories, and then based on confidence score within each set of categories. As such, in the example scenario, the ranking would be as follows:

(1) Category A, confidence score 1.0;
(2) Category B, confidence score 0.8;
(3) Category D, confidence score 1.0;
(4) Category E, confidence score 0.6;
(5) Category G, confidence score 0.8;
(6) Category H, confidence score 0.3; and
(7) Category I, confidence score 0.1.

Many other variations with other rankings are possible in other scenarios.

In certain embodiments, the category selection module 306 can be configured to select a pre-determined number of categories. For example, the pre-determined number may be 4. In the example above, the category selection module 306 could select the four highest ranked categories, i.e., Categories A, B, D, and E. In certain embodiments, the number of categories selected by the category selection module 306 can vary based on confidence scores. For example, if a specific category in the filtered set of specific categories satisfies a third confidence score threshold, the specific category can be selected as the only category to be presented as a category recommendation. For example, if the third confidence score threshold is set to 0.95, in the example scenario above, Category A can be selected as the only category to be presented as a category recommendation. In various embodiments, if multiple specific categories in the filtered set of specific categories satisfy the third confidence score threshold, the specific category with the highest confidence score can be selected as the lone category recommendation. In an alternative embodiment, if multiple specific categories in the filtered set of specific categories satisfy the third confidence score threshold, each of the multiple specific categories that satisfy the third confidence score threshold can be presented as category recommendations. In various embodiments, the third confidence score threshold may represent a very high level of certainty and, as such, may be higher than both the first and second confidence score thresholds.

The category presentation module 308 can be configured to present one or more category recommendations to user. In certain embodiments, a plurality of category recommendations can be presented to a user for selection by the user. When the user selects a particular category recommendation, the category recommendation can be automatically filled into a page category field during a page creation workflow. In certain embodiments, if only a single category recommendation is identified by the category selection module 306, the category presentation module 308 can fill in the single category recommendation into the page category field in a user interface. For example, if a particular specific category in the filtered set of specific categories satisfies the third confidence score threshold, and is presented as the only category recommendation, the particular specific category can be automatically filled into a page category field during a page creation workflow.

Figure 4:
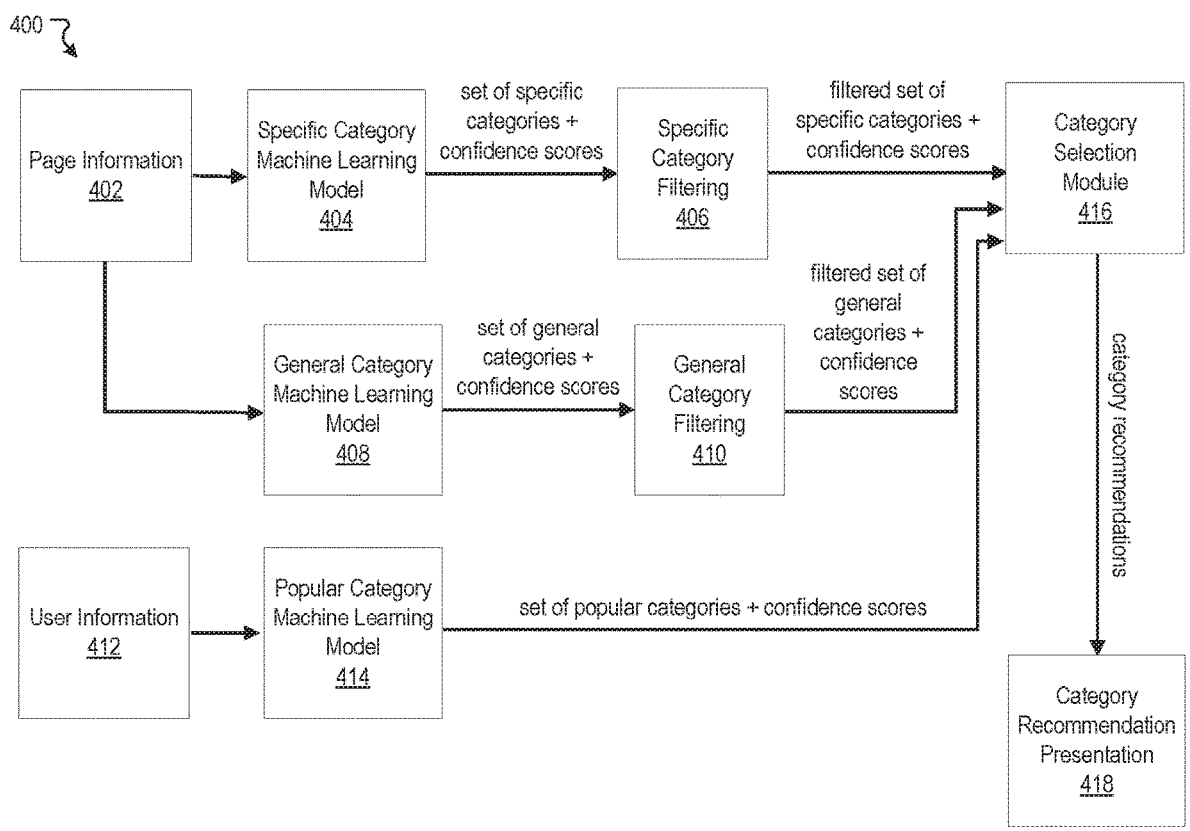
FIG. 4 illustrates an example functional block diagram associated with automated page category recommendation, according to an embodiment of the present disclosure.

FIG. 4 illustrates an example functional block diagram 400 associated with automated page category recommendations, according to various embodiments of the present disclosure. The example functional block diagram 400 demonstrates how one or more page category recommendations can be automatically identified and provided to a user during a page creation workflow for creating a page. In the example functional block diagram 400, page information 402 associated with a page being created is provided to a specific category machine learning model 404. The specific category machine learning model 404 can be trained to calculate confidence scores for a set of specific categories based on the page information 402. It can be seen that the specific category machine learning model 404 outputs confidence scores for the set of specific categories. At block 406, the set of specific categories are filtered based on confidence score. For example, all categories in the set of specific categories that do not satisfy a first confidence score threshold can be removed from consideration. The result of the filtering is a filtered set of specific categories. The filtered set of specific categories and associated confidence scores are provided to a category selection module 416.

The page information 402 is also provided to a general category machine learning model 408. The general category machine learning model 408 can be trained to calculate confidence scores for a set of general categories based on the page information 402. It can be seen that the general category machine learning model 408 outputs confidence scores for the set of general categories. At block 410, the set of general categories are filtered based on confidence score. For example, all categories in the set of general categories that do not satisfy a second confidence score threshold can be removed from consideration. The result of the filtering is a filtered set of general categories. The filtered set of general categories and associated confidence scores are provided to the category selection module 416.

User information 412 associated with a user creating a page is provided to a popular category machine learning model 414. The popular category machine learning model 414 can be trained to calculate confidence scores for a set of popular categories based on the user information 412. It can be seen that the popular category model 414 outputs confidence scores for the set of popular categories. The set of popular categories and associated confidence scores are provided to the category selection module 416.

The category selection module 416 selects one or more categories from the filtered set of specific categories, the filtered set of general categories, and the set of popular categories based on order of preference of the different sets of categories and confidence scores, as described in greater detail above. At block 418, the one or more categories selected by the category selection module 416 are presented to a user as category recommendations.

FIG. 5 illustrates an example method 500 associated with automated page category recommendation, according to an embodiment of the present disclosure. It should be appreciated that there can be additional, fewer, or alternative steps performed in similar or alternative orders, or in parallel, within the scope of the various embodiments discussed herein unless otherwise stated.

At block 502, the example method 500 can receive page information associated with a page and user information associated with a user associated with the page. At block 504, the example method 500 can calculate confidence scores for a plurality of categories based on the page information and the user information, wherein a confidence score for a category is indicative of a likelihood that the category is relevant to the page. At block 506, the example method 500 can select one or more categories of the plurality of categories based on the confidence scores. At block 508, the example method 500 can present the one or more categories to the user as category recommendations.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 6:
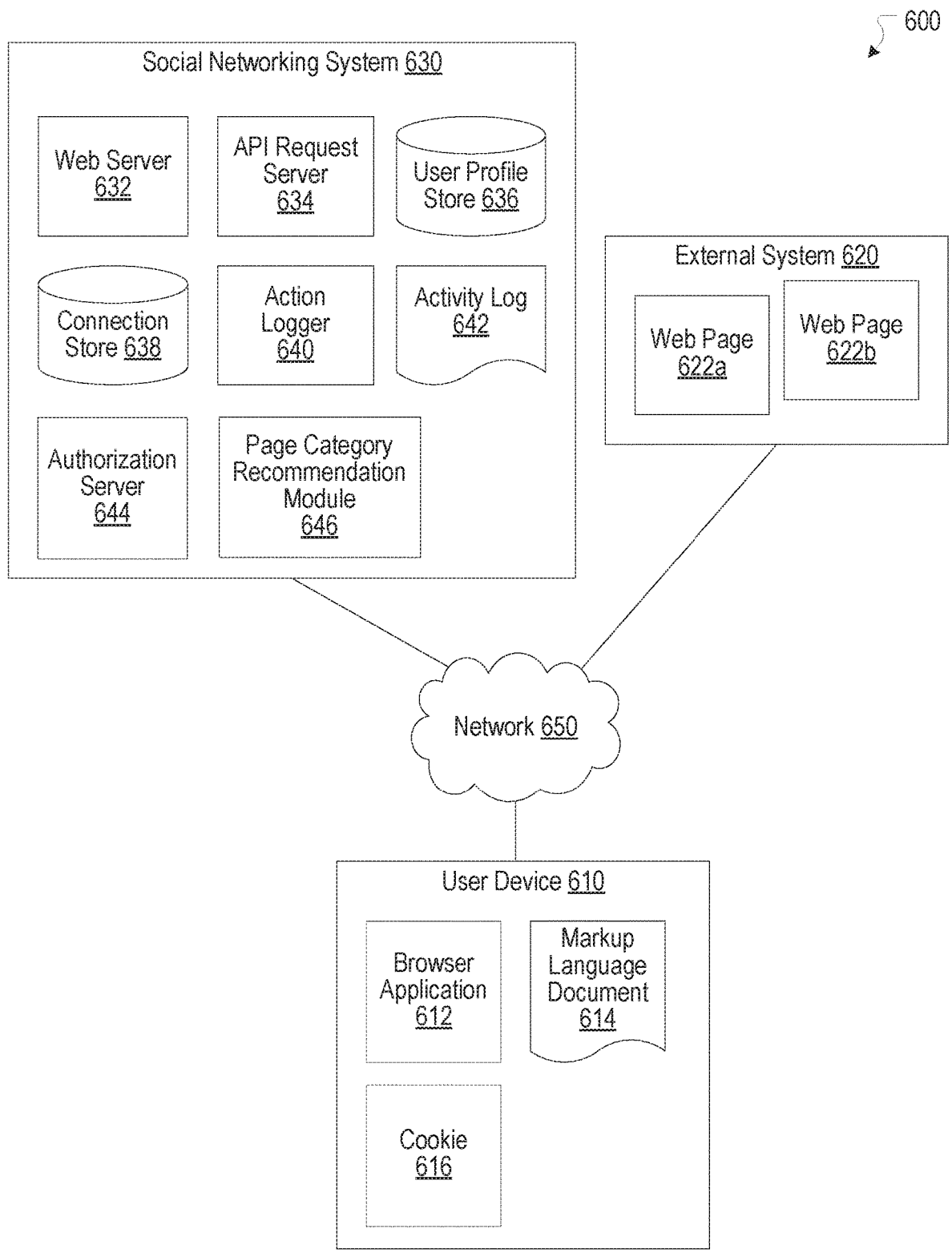
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, according to an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing engagements between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and engagements with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and engagements.

The social networking system 630 also includes user-generated content, which enhances a user's engagements with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the engagement of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the engagements and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's engagement with an external system 620 from the web server 632. In this example, the external system 620 reports a user's engagement according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing engagements between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a page category recommendation module 646. The page category recommendation module 646 can, for example, be implemented as the page category recommendation module 102, as discussed in more detail herein. As discussed previously, it should be appreciated that there can be many variations or other possibilities. For example, in some embodiments, one or more functionalities of the page category recommendation module 646 can be implemented in the user device 610.

Hardware Implementation

Figure 7:
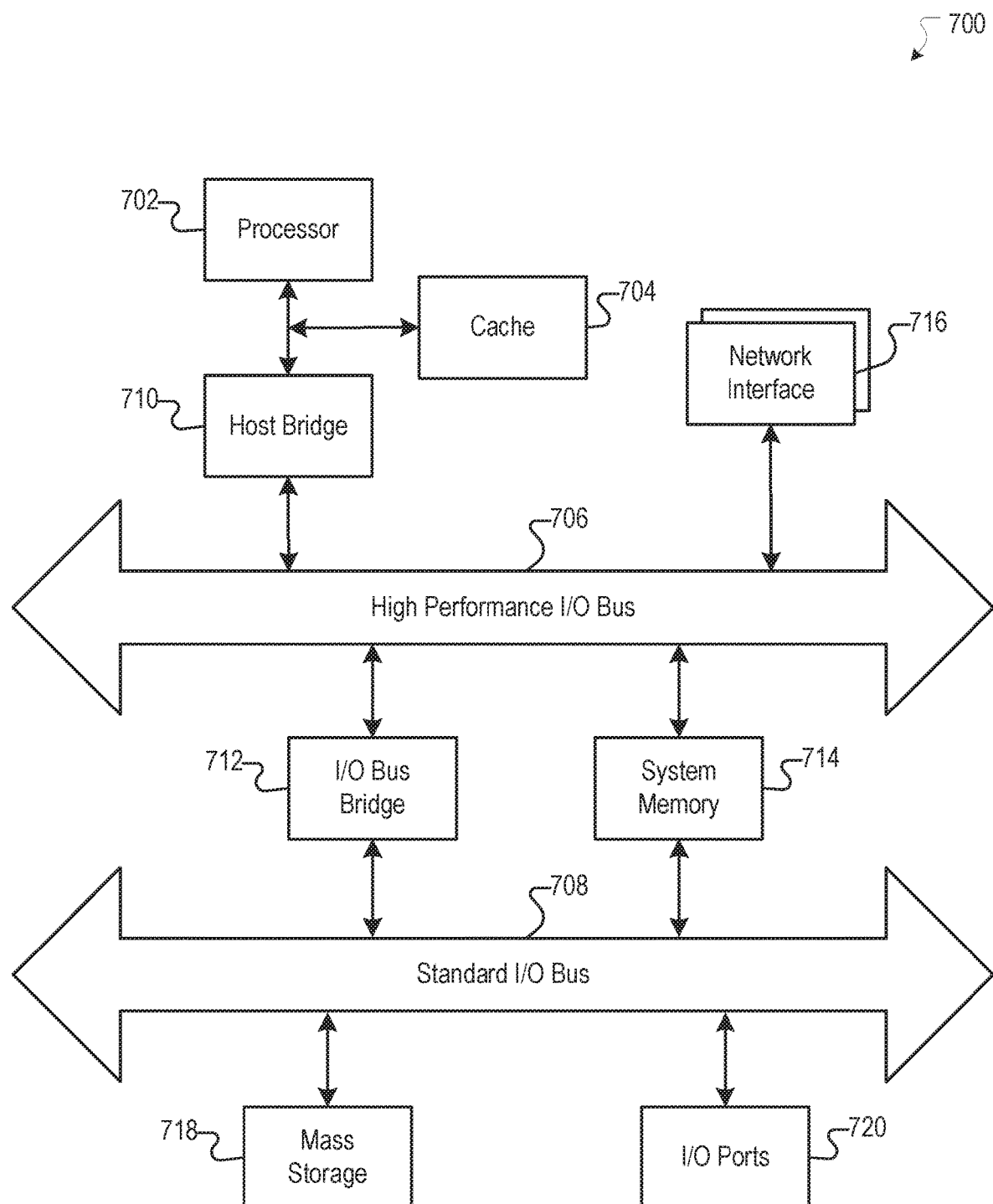
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein according to an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 620, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   receiving, by a computing system, page information associated with a page being created by a user and user information associated with the user creating the page;
   calculating, by the computing system, confidence scores for a plurality of categories based on the page information and the user information, wherein
      a confidence score for a category is indicative of a likelihood that the category is relevant to the page, and
   calculating confidence scores for a plurality of categories comprises:
      calculating confidence scores for a first plurality of categories based on a first machine learning model, and
      calculating confidence scores for a second plurality of categories based on a second machine learning model;
   selecting, by the computing system, one or more categories of the plurality of categories based on the confidence scores; and
   presenting, by the computing system, the one or more categories to the user as category recommendations.

2. The computer-implemented method of claim 1, further comprising filtering the first plurality of categories based on a first confidence score threshold to generate a filtered first set of categories.

3. The computer-implemented method of claim 2, further comprising ranking categories in the filtered first set of categories and the second plurality of categories based on confidence scores.

4. The computer-implemented method of claim 3, wherein the ranking categories in the filtered first set of categories and the second plurality of categories comprises ranking each category in the filtered first set of categories ahead of each category in the second plurality of categories.

5. The computer-implemented method of claim 2, further comprising filtering the second plurality of categories based on a second confidence score threshold to generate a filtered second set of categories.

6. The computer-implemented method of claim 5, wherein the calculating confidence scores for a plurality of categories further comprises calculating confidence scores for a third set of categories based on a third machine learning model.

7. The computer-implemented method of claim 6, further comprising ranking categories in the filtered first set of categories, the filtered second set of categories, and the third set of categories based on confidence scores, wherein the ranking comprises:
   ranking each category in the filtered first set of categories ahead of each category in the filtered second set of categories, and
   ranking each category in the filtered second set of categories ahead of each category in the third set of categories.

8. The computer-implemented method of claim 1, wherein the selecting one or more categories of the plurality of categories comprises selecting a predetermined number of categories.

9. A system comprising:
   at least one processor; and
   a memory storing instructions that, when executed by the at least one processor, cause the system to perform a method comprising:
      receiving page information associated with a page being created by a user and user information associated with the user creating the page;
      calculating confidence scores for a plurality of categories based on the page information and the user information, wherein a confidence score for a category is indicative of a likelihood that the category is relevant to the page, and calculating confidence scores for a plurality of categories comprises:
  calculating confidence scores for a first plurality of categories based on a first machine learning model, and
  calculating confidence scores for a second plurality of categories based on a second machine learning model;

selecting one or more categories of the plurality of categories based on the confidence scores; and presenting the one or more categories to the user as category recommendations.

10. The system of claim 9, wherein the method further comprises filtering the first plurality of categories based on a first confidence score threshold to yield a filtered first set of categories.

11. The system of claim 10, wherein the method further comprises ranking categories in the filtered first set of categories and the second plurality of categories based on confidence score.

12. A non-transitory computer-readable storage medium including instructions that, when executed by at least one processor of a computing system, cause the computing system to perform a method comprising:
  receiving page information associated with a page being created by a user and user information associated with the user creating the page;
  calculating confidence scores for a plurality of categories based on the page information and the user information, wherein
    a confidence score for a category is indicative of a likelihood that the category is relevant to the page, and
    calculating confidence scores for a plurality of categories comprises:
      calculating confidence scores for a first plurality of categories based on a first machine learning model, and
      calculating confidence scores for a second plurality of categories based on a second machine learning model;
  selecting one or more categories of the plurality of categories based on the confidence scores; and
  presenting the one or more categories to the user as category recommendations.

13. The non-transitory computer-readable storage medium of claim 12, wherein the method further comprises filtering the first plurality of categories based on a first confidence score threshold to yield a filtered first set of categories.

14. The non-transitory computer-readable storage medium of claim 13, wherein the method further comprises ranking categories in the filtered first set of categories and the second plurality of categories based on confidence score.

* * * * *